(12) United States Patent
Yu

(10) Patent No.: US 11,661,131 B1
(45) Date of Patent: May 30, 2023

(54) HORIZONTAL LIGHTING PATTERN ADJUSTMENT SYSTEM FOR A VEHICLE HEADLIGHT

(71) Applicant: TA YIH INDUSTRIAL CO., LTD., Tainan (TW)

(72) Inventor: Cheng-Yi Yu, Tainan (TW)

(73) Assignee: Ta Yih Industrial Co., Ltd., Tainan (TW)

( * ) Notice: Subject to any disclaimer, the term of this patent is extended or adjusted under 35 U.S.C. 154(b) by 0 days.

(21) Appl. No.: 17/655,603

(22) Filed: Mar. 21, 2022

(30) Foreign Application Priority Data

Dec. 22, 2021 (TW) .................................. 110148186

(51) Int. Cl.
| | |
|---|---|
| *B62J 6/023* | (2020.01) |
| *F21V 14/02* | (2006.01) |
| *B60Q 1/11* | (2006.01) |
| *B60Q 1/10* | (2006.01) |
| *B60Q 1/115* | (2006.01) |

(52) U.S. Cl.
CPC .............. *B62J 6/023* (2020.02); *F21V 14/02* (2013.01); *B60Q 1/10* (2013.01); *B60Q 1/11* (2013.01); *B60Q 1/115* (2013.01)

(58) Field of Classification Search
CPC ... B62J 6/023; B60Q 1/04; B60Q 1/10; B60Q 1/08; B60Q 1/06; B60Q 1/11; B60Q 1/115; B60Q 1/12; B60Q 1/122; B60Q 1/124; B60Q 3/85
See application file for complete search history.

(56) References Cited

U.S. PATENT DOCUMENTS

| | | | | |
|---|---|---|---|---|
| 4,870,545 | A * | 9/1989 | Hatanaka ............... | B60Q 1/122 |
| | | | | 362/466 |
| 6,183,118 | B1 * | 2/2001 | Toda ...................... | B60Q 1/115 |
| | | | | 362/465 |
| 6,641,292 | B2 * | 11/2003 | Miki ...................... | B60Q 1/076 |
| | | | | 362/284 |
| 2010/0168958 | A1 * | 7/2010 | Baino ...................... | B62J 6/027 |
| | | | | 702/94 |
| 2016/0339834 | A1 * | 11/2016 | Oshima .................. | B60Q 1/115 |
| 2017/0182929 | A1 * | 6/2017 | Sakamoto ............... | B62J 6/023 |
| 2017/0225735 | A1 * | 8/2017 | Sáez López ............. | B62J 6/023 |
| 2018/0257540 | A1 * | 9/2018 | Ohsawa .................. | B60Q 1/115 |
| 2018/0334082 | A1 * | 11/2018 | Huang .................... | F21S 41/39 |
| 2019/0283662 | A1 * | 9/2019 | Hashimoto ............. | F21V 21/30 |
| 2019/0366909 | A1 * | 12/2019 | Kimura ................... | B62J 6/023 |
| 2020/0384910 | A1 * | 12/2020 | Berger ................... | B60Q 1/076 |

* cited by examiner

*Primary Examiner* — Bryon T Gyllstrom
*Assistant Examiner* — James M Endo
(74) *Attorney, Agent, or Firm* — Rosenberg, Klein & Lee

(57) ABSTRACT

A headlight horizontal lighting pattern adjustment system includes an inclination angle sensor connected to a vehicle to sense an inclination angle value of the vehicle. A processing unit receives the inclination angle value and processes the inclination angle value into a driving value. A driving module drives a lighting device. The driving module commands the driving device to driving and rotate the lighting device according the driving value. The headlight horizontal lighting pattern adjustment system is equipped to a motorbike or an electric motorbike. When the motorbike turns and tilt, the processing unit adjusts the light of the lighting device by the driving module and the driving device to eliminate dark corners in the dark zone and maintains the full scale of light pattern to enhance safety to all the road users.

7 Claims, 12 Drawing Sheets

(12) United States Patent
US 11,661,131 B1

HORIZONTAL LIGHTING PATTERN ADJUSTMENT SYSTEM FOR A VEHICLE HEADLIGHT

BACKGROUND OF THE INVENTION

1. Fields of the Invention

The present invention relates to a headlight horizontal lighting pattern adjustment system which adjusts the lighting device according to the inclination angle of the vehicle when turning so as to maintain the horizontal lighting pattern and to eliminate dark area.

2. Descriptions of Related Art

Vehicles are equipped with lights which allow the drivers to clearly observe the road conditions, and also to enable pedestrians to easily recognize the direction and position of the vehicle. In order to prevent glare generated from the light to cause temporary blind to the drivers of oncoming vehicles, relevant laws and regulations are created to regulate the light patterns, and there must be a clear cut-off line to prevent the oncoming vehicles from being affected, thereby improving the traffic safety of all road users.

For two-wheeled vehicles, such as motorbikes or electric motorbikes, although the light zone "A" has complied with laws and regulations, nevertheless, as shown in FIG. 1, the body of the two-wheeled vehicle will tilt by an angle when turning, and the area of the light zone "A" increases due to the turning action. Especially when turning to the left, the area of the dark zone D will be larger, which is due to the cut-off line of light and dark, the area of the dark zone "D" on the left side is low, resulting in a visible dark area at the upper left of the light zone when turning left, so that the driver cannot have a clear left-front vision. If it is at night or in a darker place, this will severely affect the driver's vision at the left-front area and will greatly affect driving safety.

The present invention intends to provide a headlight horizontal lighting pattern adjustment system to eliminate the shortcomings mentioned above.

SUMMARY OF THE INVENTION

The present invention relates to a headlight horizontal lighting pattern adjustment system, and comprises an inclination angle sensor connected to a vehicle so as to sense the inclination angle value of the vehicle. A processing unit is connected to the inclination angle sensor and receives the inclination angle value, and processes the inclination angle value into a driving value. A driving module is coupled to the processing unit and a driving device. The driving device drives a lighting device. The driving module commands the driving device to driving and rotate the lighting device according the driving value.

Preferably, the driving deice includes a motor and an output shaft which is driven by the motor. The lighting device includes a rotary seat, and a receiving portion is formed axially in the first end of the rotary seat. The output shaft is engaged with the receiving portion.

Preferably, the rotary seat includes at least one lighting unit connected to the second end of the rotary seat and is located opposite to the receiving portion. A lens module is mounted to the second end of the rotary seat.

Preferably, a case includes a disk which is mounted to the rotary seat. A bearing unit is located between the disk and the rotary seat.

Preferably, the bearing unit is a thin-wall bearing, a ball bearing or a sleeve bearing.

Preferably, the output shaft includes a hole that faces the receiving portion of the rotary seat.

Preferably, an adjustment member is engaged with the hole of the output shaft of the motor.

Preferably, the adjustment unit is pivotably connected to a case. A resilient member is located between the case and the adjustment unit. When the adjustment unit compresses the resilient member, the adjustment member is engaged with the hole of the output shaft.

Preferably, the inclination angle sensor is an Inertial Measurement Unit (IMU).

Preferably, the vehicle is a motorbike or an electric motorbike.

The advantages of the present invention are that the inclination angle sensor sense the inclination angle value of the vehicle, and the processing unit receives the inclination angle value and processes the inclination angle value into a driving value so that the driving module commands the driving device to driving and rotate the lighting device according the driving value. The light pattern is adjusted when the vehicle turns and tilts so as to compensate the lighting in the dark zone and to eliminate dark corners in the dark zone.

The motor drives the output shaft which drives and rotates the lighting device. When the motor fails, or has zero deviation, the user uses a screwdriver or the adjustment unit to be inserted into the hole of the output shaft to rotate the output shaft manually to adjust the lighting angle of the lighting device, or to correct the initial position of the motor.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
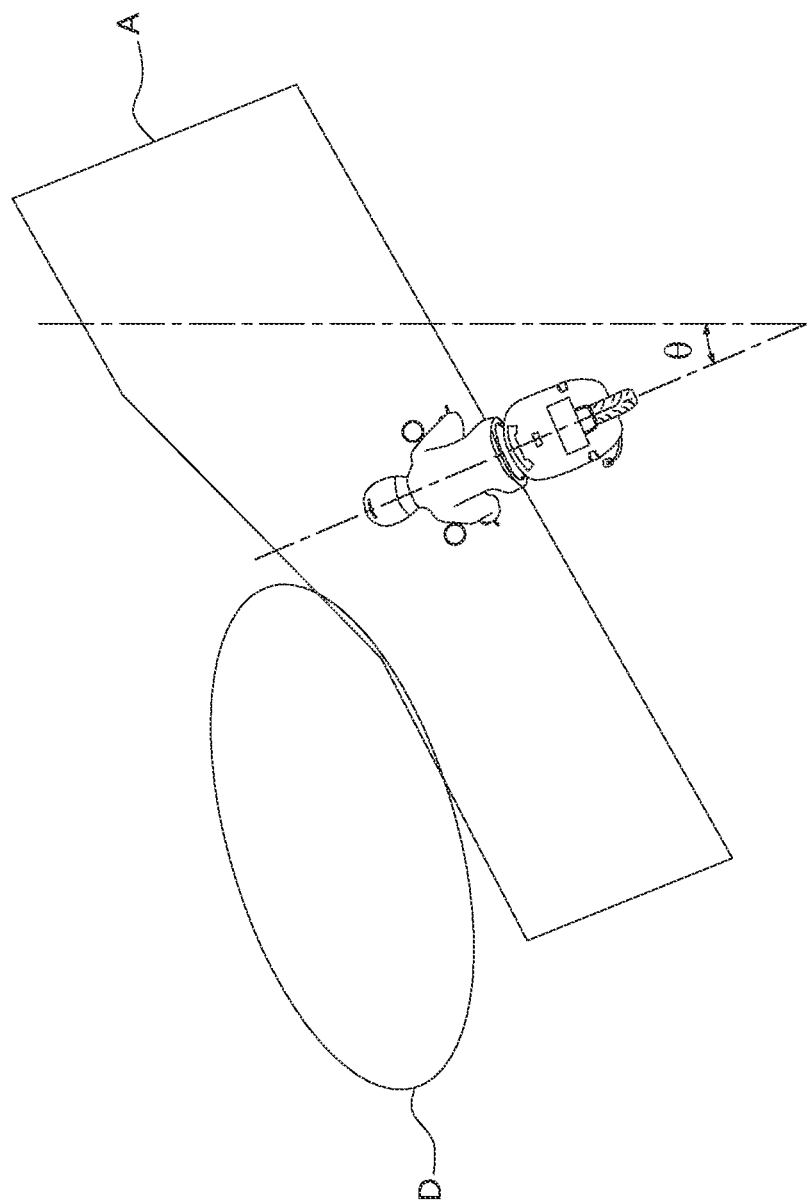
FIG. 1 shows the lighting pattern when a conventional vehicle turns.
Figure 2:
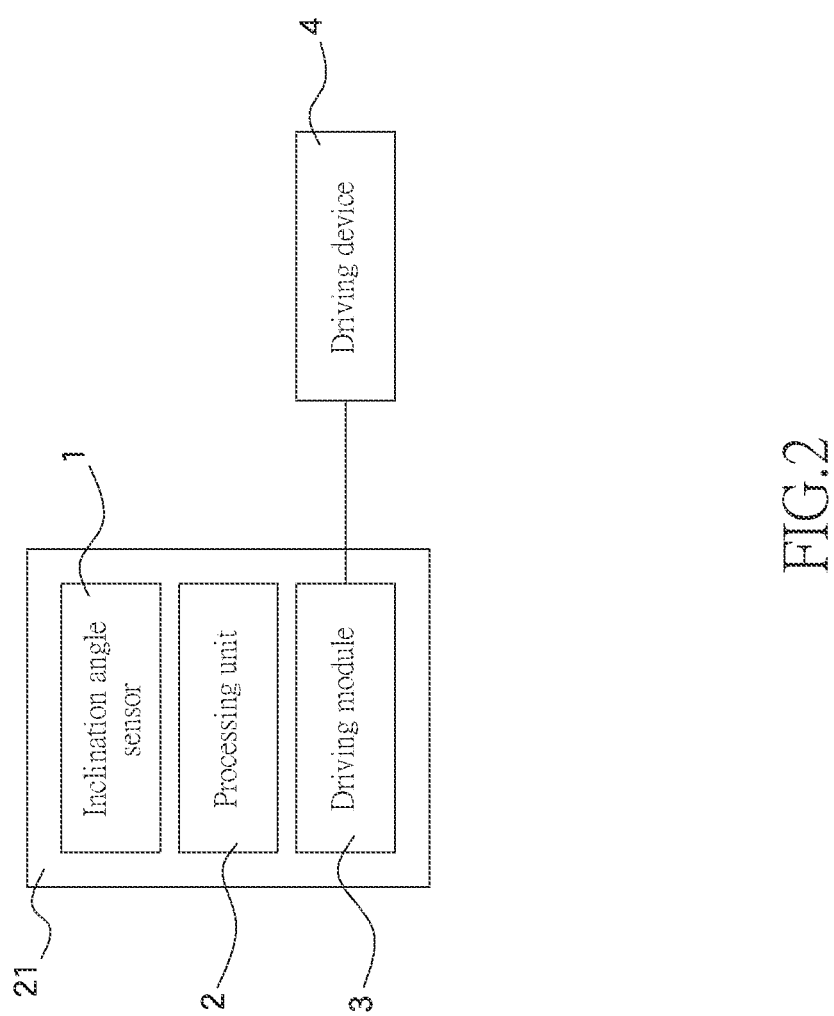
FIG. 2 shows the components of the headlight horizontal lighting pattern adjustment system of the present invention.
Figure 3:
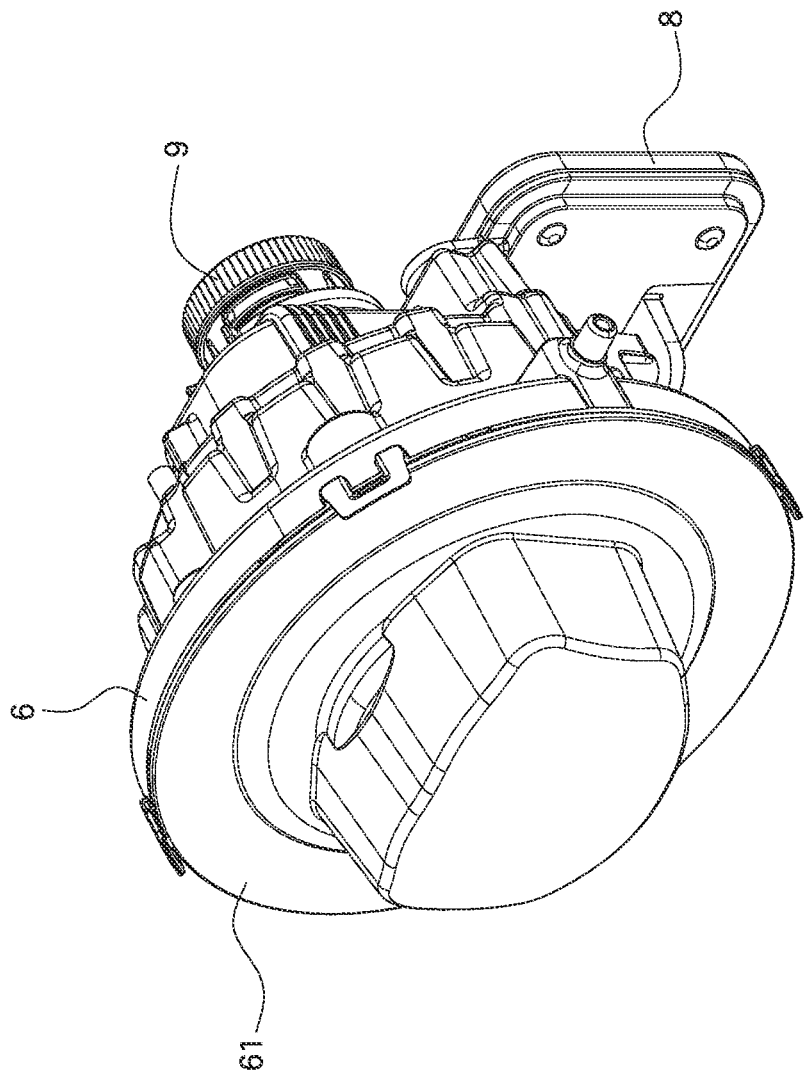
FIG. 3 is a perspective view to show the headlight horizontal lighting pattern adjustment system of the present invention.
Figure 4:
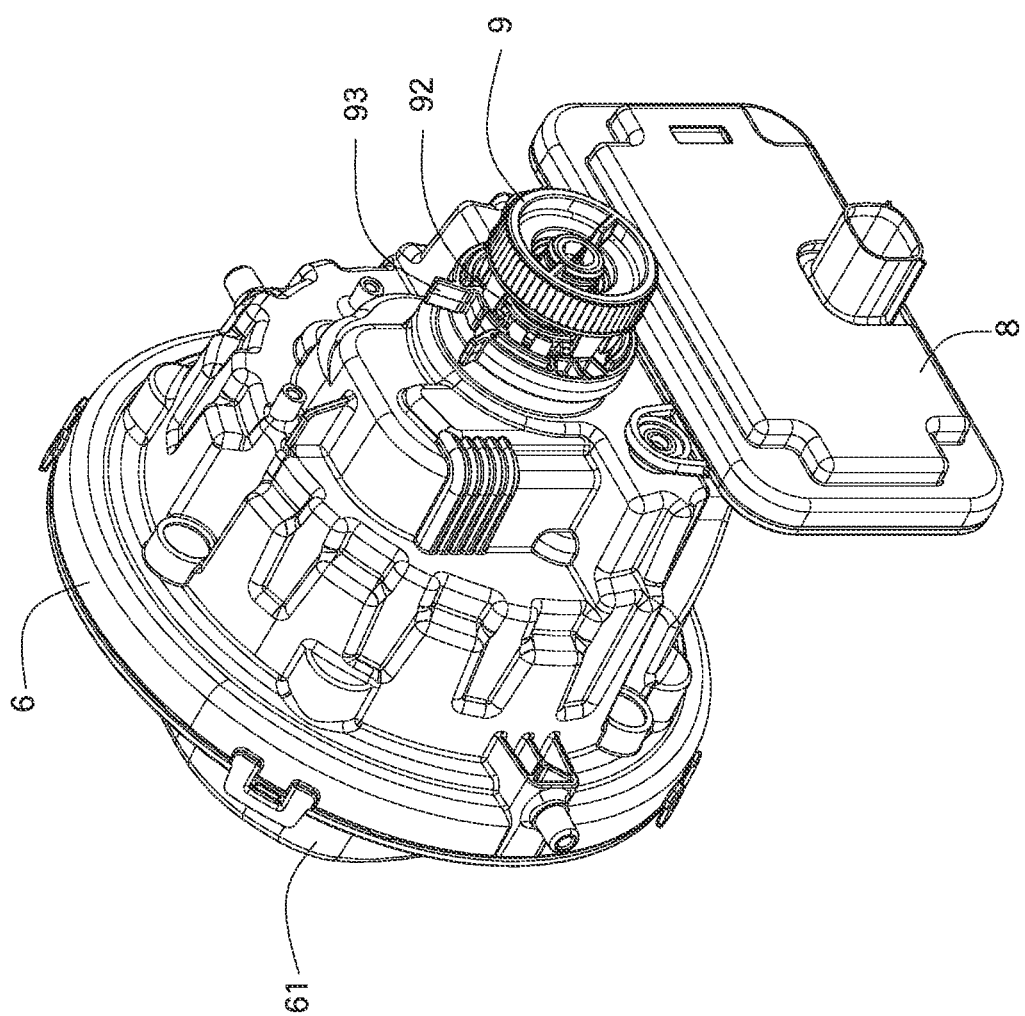
FIG. 4 is another perspective view to show the headlight horizontal lighting pattern adjustment system of the present invention.

Referring to FIGS. 2 to 6, the headlight horizontal lighting pattern adjustment system of the present invention comprises an inclination angle sensor 1 which is equipped to a vehicle, such as a motorbike or an electric motorbike so as to sense the inclination angle value of the vehicle. In one embodiment, the inclination angle sensor 1 is an Inertial Measurement Unit (IMU) to detect the acceleration from three axial directions.

A processing unit 2 is connected to the inclination angle sensor 1 and receives the inclination angle value, so as to process the inclination angle value into a driving value.

A driving module 3 is coupled to the processing unit 2 and a driving device 4. The driving device 4 enables to drive a lighting device 5. The driving module 3 commands the driving device 4 to driving and rotate the lighting device 5 according the driving value. In one embodiment, the driving deice 4 is a motor 41 such as a servo motor or stepping motor. The driving value can be set as the revolution per minute, or the Pulse, such that the processing unit 2 sets a proper driving value according to the inclination angle value, to command the driving device 4 to driving and rotate the lighting device 5 to the angle of the inclination angle value.

Figure 7:
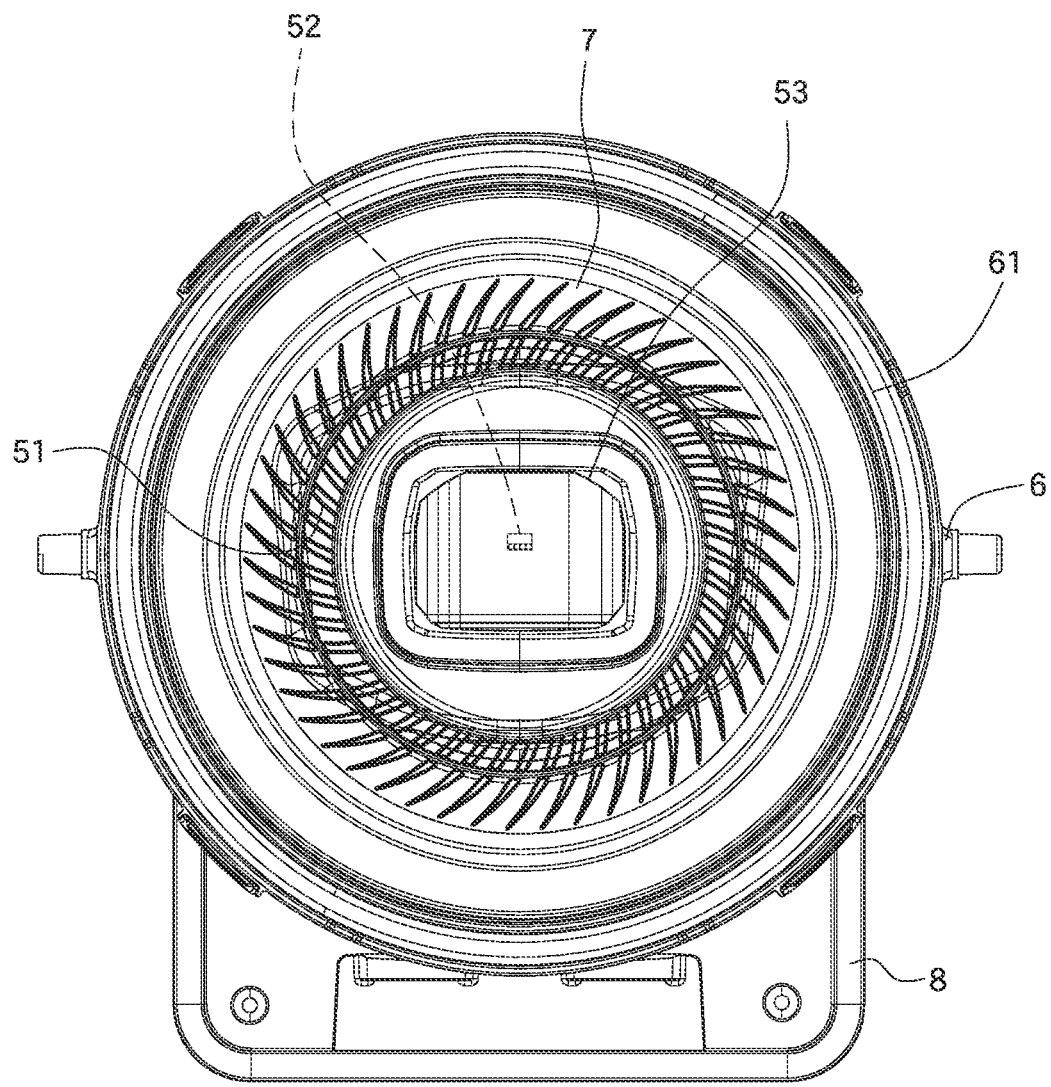
FIG. 7 shows the front view of the headlight horizontal lighting pattern adjustment system of the present invention.
Figure 8:
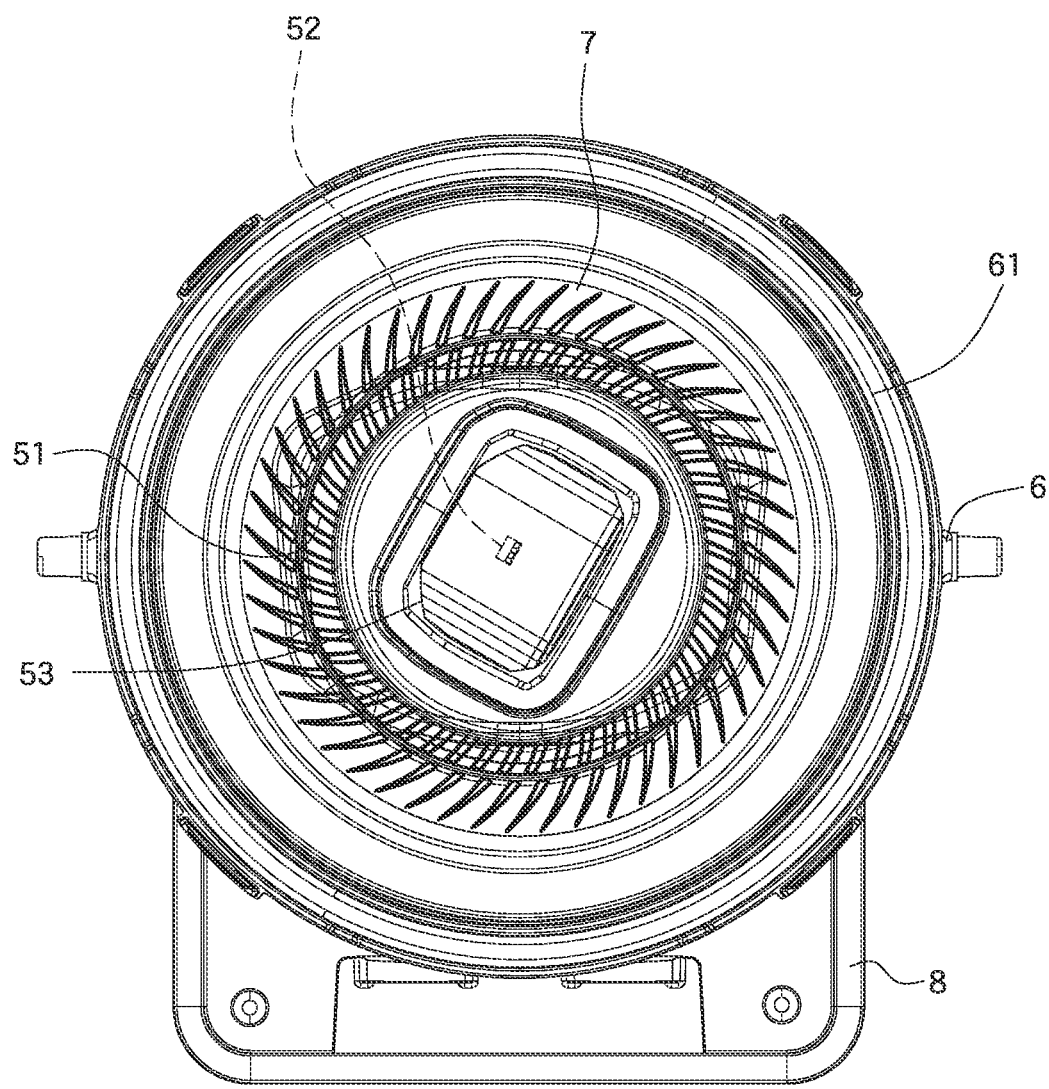
FIG. 8 shows that the lighting device is rotated when the vehicle turns.
Figure 9:
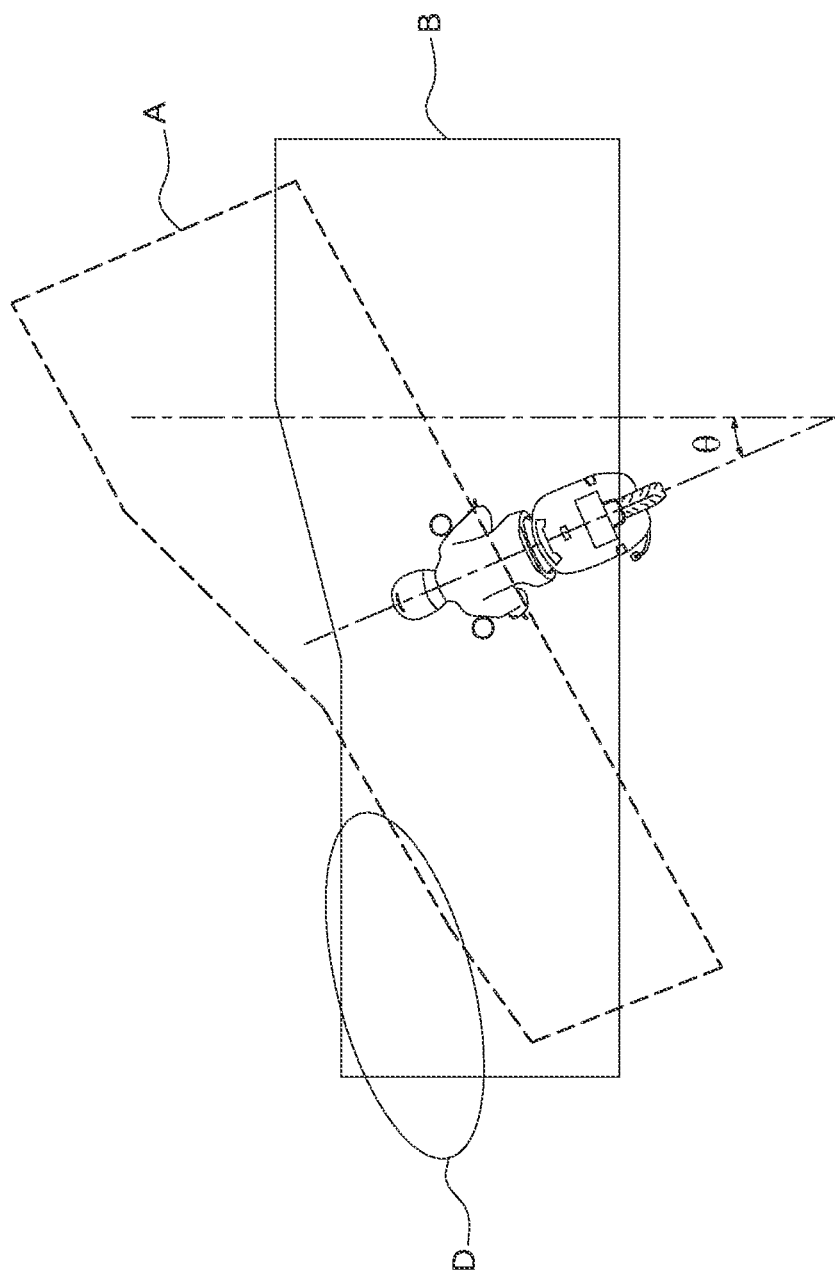
FIG. 9 shows the comparison of the lighting pattern of the conventional vehicle and the lighting pattern of the headlight horizontal lighting pattern adjustment system of the present invention.

As shown in FIG. 7, when the vehicle does not turn and is perpendicular to the ground, the lighting device 5 projects a horizontal lighting pattern. When the vehicle turns and tilts as shown in FIGS. 8 and 9, the inclination angle sensor 1 senses the inclination angle "θ" of the vehicle and correspondingly generates an inclination angle value. The processing unit 2 receives the inclination angle value, and processes the inclination angle value into a driving value. The driving module 3 then drives the driving device 4 which drives and rotates the lighting device 5. The lighting device 5 rotates an angle correspondingly as shown in FIG. 8. Preferably, the lighting pattern "B" projected from the lighting device 5 is a horizontal light, so that the processing unit 2 is able to rotate the lighting device 5 via the driving device 4 to ensure that the lighting pattern is a horizontal light no matter the vehicle tilts left or right. As shown in FIG. 9, comparing the dotted lines representing the lighting pattern from a conventional vehicle, the present invention compensate the dark zone "D" of the light zone "A" when the vehicle turns to eliminate dark corners. Therefore, the motorist can observe the road conditions clearly to enhance safety to all of the road users.

Figure 5:
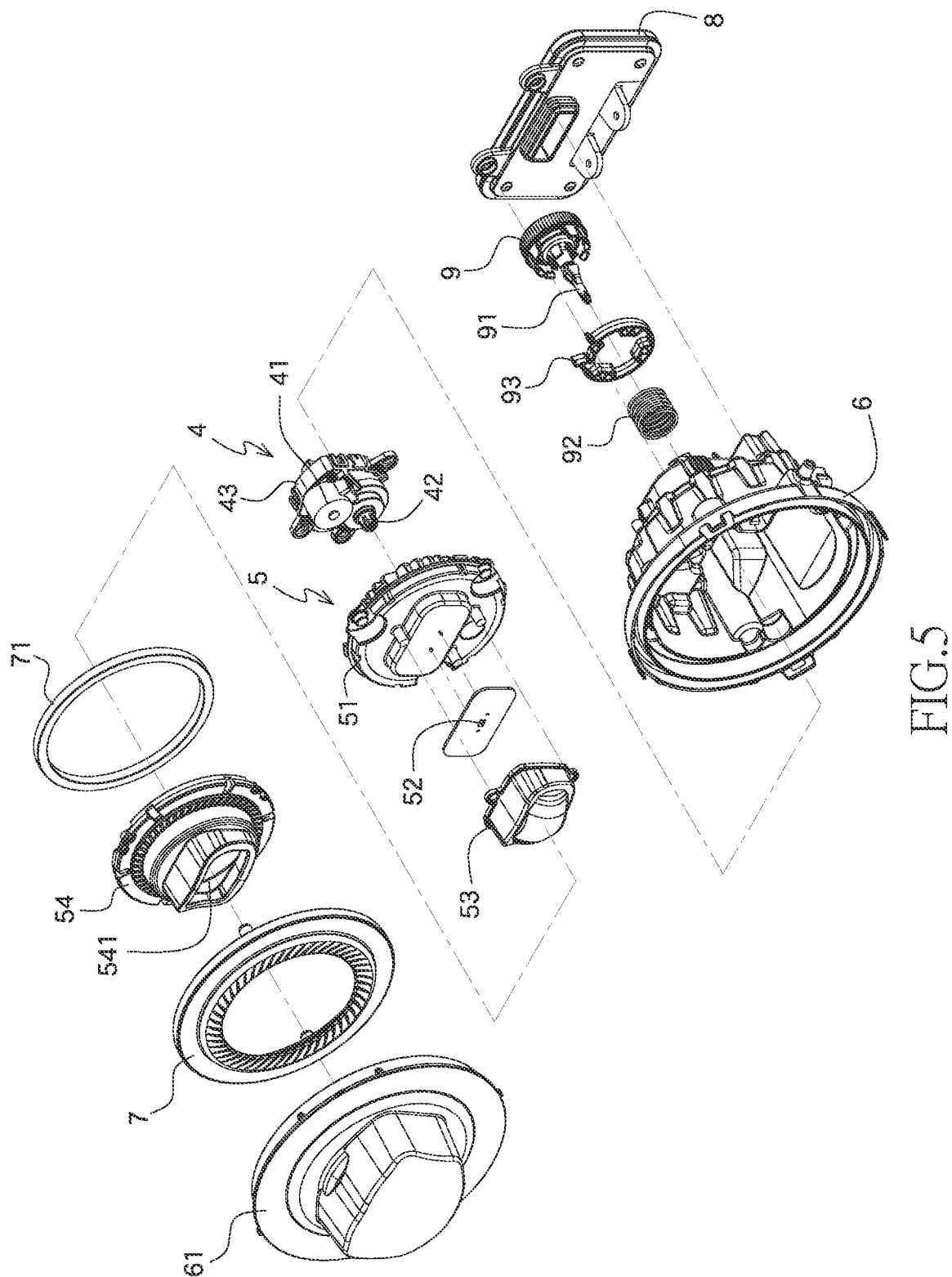
FIG. 5 is an exploded view of the headlight horizontal lighting pattern adjustment system of the present invention.
Figure 10:
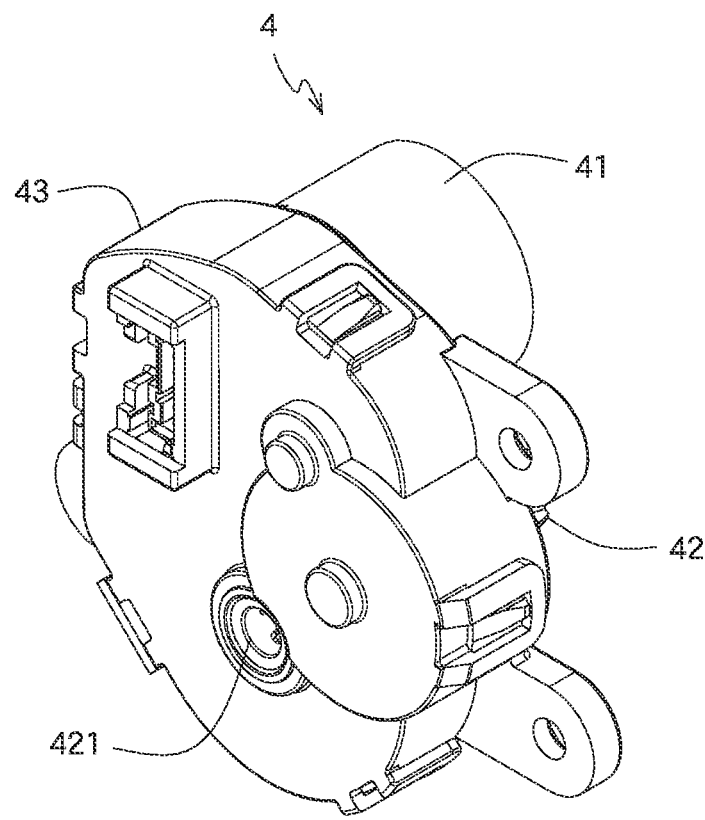
FIG. 10 shows another perspective view of the driving device of the present invention.
Figure 11:
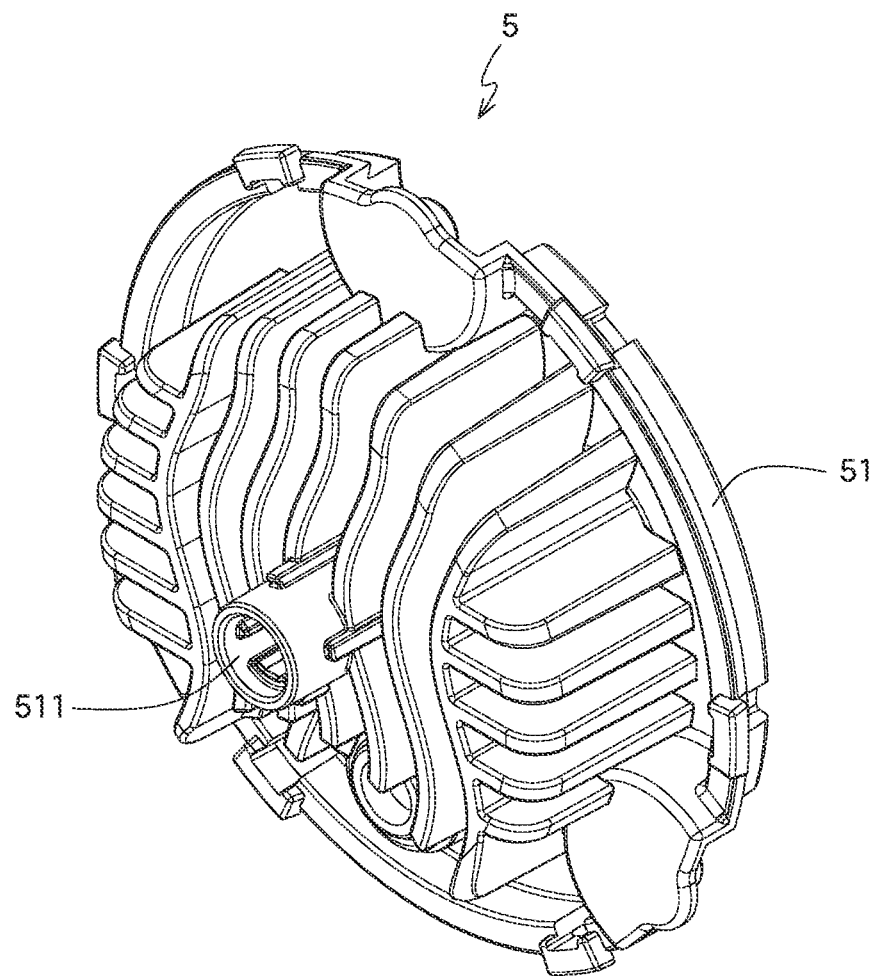
FIG. 11 shows another perspective view of the lighting device of the present invention.

As shown in FIGS. 5, 10 and 11, in one embodiment, the driving deice 4 includes a motor 41 and an output shaft 42 which is driven by the motor 41. The motor device 4 includes a motor seat 43 for accommodating the motor 41 therein, and the output shaft 42 is pivotably connected to the motor seat 43 so that the motor 41 directly drives the output shaft 42. Of course, a gear set can be cooperated with the motor device 4 according to torque and transmission required so as to micro-adjust speed reduction to increase precision of angle adjustment of the lighting device 5. The lighting device 5 includes a rotary seat 51, and a receiving portion 511 is formed axially in the first end of the rotary seat 51. The output shaft 42 is engaged with the receiving portion 511. In one embodiment, the receiving portion 511 is a non-circular recess, and the output shaft 42 is shaped to be engaged with the receiving portion 511 correspondingly, such that the output shaft 42 is able to rotate the rotary seat 51.

The rotary seat 51 includes at least one lighting unit 52 connected to the second end of the rotary seat 51 and is located opposite to the receiving portion 511. A lens module 53 is mounted to the second end of the rotary seat 51 so as to protect the at least one lighting unit 52 which emits light through the lens module 53 and the light complies with related regulation.

The headlight further comprises case 6 having a disk 7. The disk 7 is mounted to the rotary seat 51. A bearing unit 71 is located between the disk 7 and the rotary seat 51. The disk 7 supports the rotary seat 51, and the rotary seat 51 is smoothly rotated relative to disk 7 via the bearing unit 71. That is to say, the motor 41 drives the output shaft 42, and the output shaft 42 smoothly drives the rotary seat 51. In one embodiment, the bearing unit 71 is a thin-wall bearing, a ball bearing or a sleeve bearing.

It is noted that the inclination angle sensor 1, the processing unit 2 and the driving module 3 can be combined in a circuit board 21 that is located within a control box 8. The control box 8 is fixed to one end of the case 6 to be a one-piece module. In other embodiments, wires or cables are used to be connected to the vehicle to reduce the expense cost and cab be conveniently equipped to the existed vehicles.

A decoration frame 54 providing decoration features is connected to the second end of the rotary seat 51 so as to position the lens module 53 and covers the rotary seat 51. The decoration frame 54 includes an opening 541 with which the lens module 53 is engaged. The decoration frame 54 is fixed to the rotary seat 51, so that the decoration frame 54 is co-rotated with the rotary seat 51. The bearing unit 71 is located between the decoration frame 54 and the disk 7. The case 6 is located connected to the rotary seat 51 and opposite to the disk 7. The case 6 has a housing 61 that protects the disk 7, the decoration frame 54 and the rotary seat 51.

In order to allow the lighting device 5 or the motor 41 to be easily adjusted, or when the motor 41 fails, the rotational angle of the lighting device 5 is able to be adjusted, the output shaft 42 includes a hole 421 that faces the receiving portion 511 of the rotary seat 51 as shown in FIG. 10. The hole 421 is a non-circular hole or recess. When adjusting the lighting device 5 or the motor 41, via a maintenance hole of the case 6, a tool such as a screwdriver is directly inserted into the hole 421 to rotate the output shaft 42 without using any special tool. The output shaft 42 rotates the lighting device 5, also the core of the motor 41 is rotated to achieve the purposes of micro-adjustment.

Figure 6:
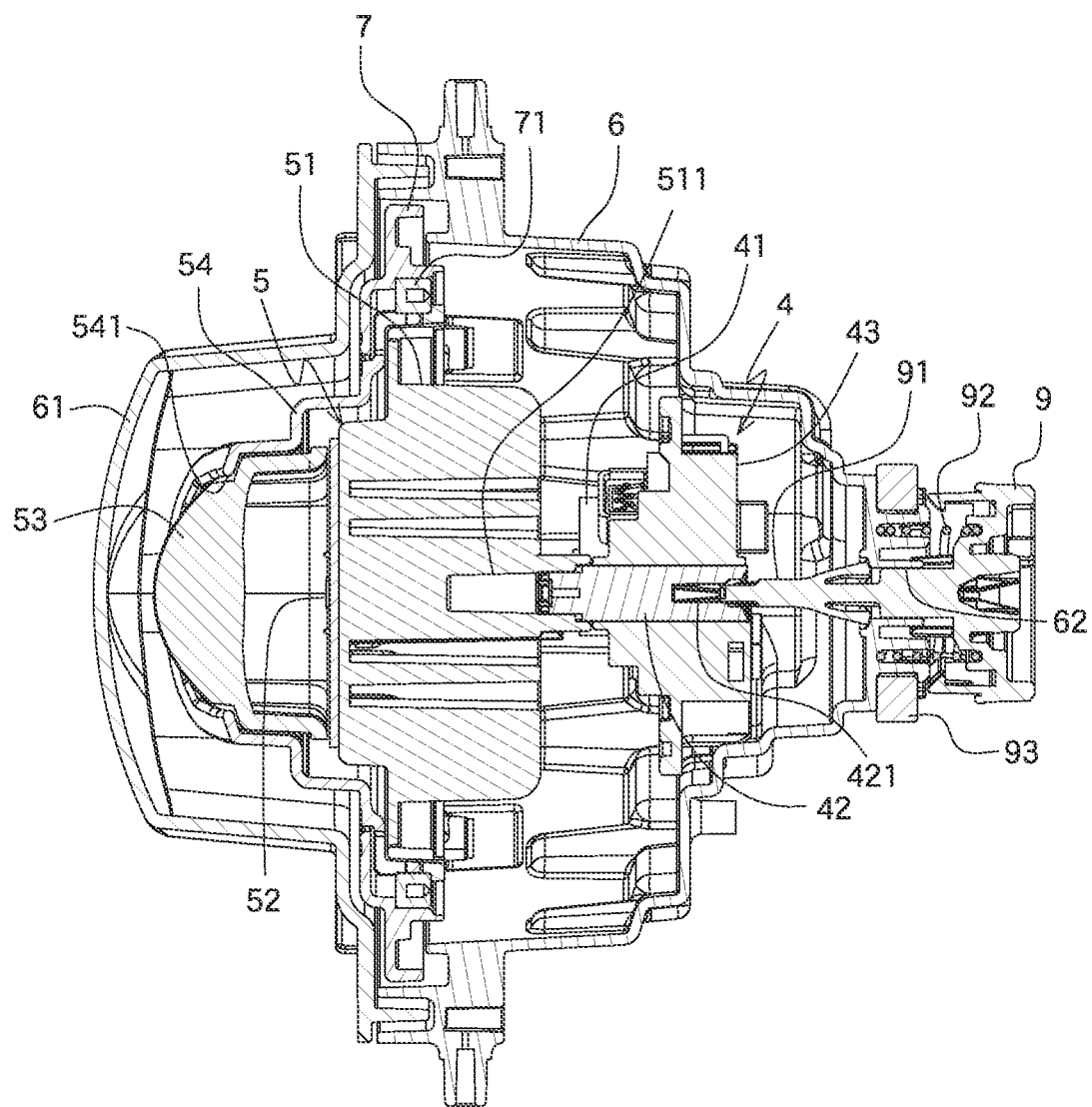
FIG. 6 is a cross sectional view of the headlight horizontal lighting pattern adjustment system of the present invention.
Figure 12:
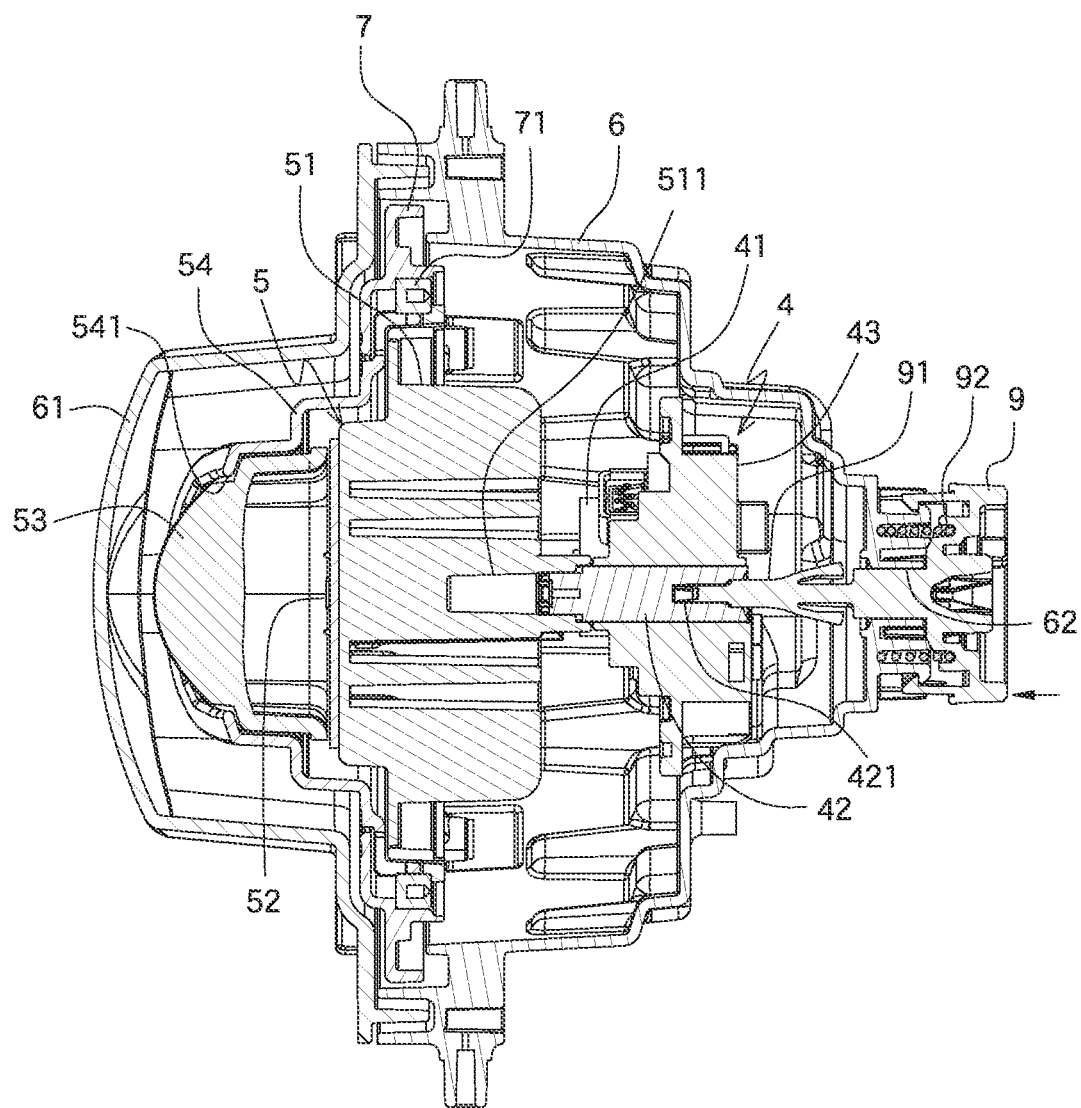
FIG. 12 shows that the adjustment unit proceeds adjustment to the output shaft of the motor.

The headlight horizontal lighting pattern adjustment system further comprises an adjustment member 91 which is engaged with the hole 421 of the output shaft 42 of the motor 41. A resilient member 92 is located between the case 6 and the adjustment unit 9. The adjustment unit 9 is connected to the case 6 by using a C-clip 93. The case 6 includes a path 62 into which the adjustment member 91 is inserted and reaches the hole 421. In a normal status, as shown in FIG. 6, in order to prevent the motor 41 from driving the adjustment unit 9 when driving the output shaft 42 to cause resistance to the motor 41, thanks to the resilient member 92 and the C-clip 93, the resilient member 92 biases the adjustment unit 9 so that the adjustment member 91 does not engaged with the hole 421 in normal status and is positioned by the C-clip 93 in axial direction. When adjusting the lighting device 5 or the motor 41, as shown in FIG. 12, the C-clip 93 is removed, the adjustment unit 9 is removed to engage the adjustment member 91 with the hole 421. The resilient member 92 is compressed, by rotating the adjustment unit 9, the adjustment member 91 drives the output shaft 42 to adjust the lighting device 5 or the motor 41.

While we have shown and described the embodiment in accordance with the present invention, it should be clear to those skilled in the art that further embodiments may be made without departing from the scope of the present invention.

What is claimed is:

1. A headlight horizontal lighting pattern adjustment system, comprising:
   an inclination angle sensor connected to a vehicle, the inclination angle sensor sensing an inclination angle value of the vehicle;
   a processing unit connected to the inclination angle sensor and receiving the inclination angle value, and processing the inclination angle value into a driving value;
   a driving module coupled to the processing unit and a driving device, the driving device driving a lighting device, the driving module driving the driving device according to the driving value to thereby rotate the lighting device according to the driving value;
   wherein the driving device includes a motor and an output shaft driven by the motor, the lighting device including a rotary seat having a first side and a second opposing side, a receiving portion formed axially at the first side of the rotary seat and at least one lighting unit connected to the second side of the rotary seat to be located opposite to the receiving portion, the output shaft having a first axial end and a second axial end, the first axial end of the output shaft being directly connected with the receiving portion at the first side of the rotary seat to thereby directly drive the rotary seat of the lighting device to rotate about an axis defined by the output shaft; and
   an adjustment unit pivotably coupled to the driving device, a hole formed at the second axial end of the output shaft extending from a receiving portion to an engaging portion, an adjustment member of the adjustment unit is disposed in the receiving portion of the hole in a first state and is manually displaceable into the engaging portion of the hole in a second state, and thereby the adjustment member being releasably drivingly coupled to the output shaft to selectively manually drive the rotary seat of the lighting device to rotate about the axis of the output shaft in the second state.

2. The headlight horizontal lighting pattern adjustment system as claimed in claim 1, wherein a lens module is mounted to the second side of the rotary seat.

3. The headlight horizontal lighting pattern adjustment system as claimed in claim 1, further comprising a case having a disk, the disk mounted to the rotary seat, a bearing unit located between the disk and the rotary seat.

4. The headlight horizontal lighting pattern adjustment system as claimed in claim 3, wherein the bearing unit is a thin-wall bearing, a ball bearing, or a sleeve bearing.

5. The headlight horizontal lighting pattern adjustment system as claimed in claim 1, further comprising a case, the adjustment unit pivotably connected to the case, a resilient member located between the case and the adjustment unit, and responsive to the adjustment unit compressing the resilient member, the adjustment member of the adjustment unit being drivingly coupled with the engaging portion of the hole at the second axial end of the output shaft in the second state.

6. The headlight horizontal lighting pattern adjustment system as claimed in claim 1, wherein the inclination angle sensor is an Inertial Measurement Unit (IMU).

7. The headlight horizontal lighting pattern adjustment system as claimed in claim 1, wherein the vehicle is a motorbike or an electric motorbike.

\* \* \* \* \*